United States Patent Office 3,444,269
Patented May 13, 1969

3,444,269
POLYBLENDS COMPRISING A VINYL CHLORIDE GRAFT COPOLYMER, A STYRENE-METHYL METHACRYLATE-BUTADIENE GRAFT COPOLYMER AND A VINYL POLYMER
Ludwig A. Beer, Agawam, Mass., assignor to Monsanto Company, St. Louis, Mo., a corporation of Delaware
No Drawing. Filed Aug. 23, 1965, Ser. No. 481,945
Int. Cl. C08f *37/18*
U.S. Cl. 260—876                                                   5 Claims

ABSTRACT OF THE DISCLOSURE

Three-component blends comprising a vinyl halide polymer, vinyl halide graft copolymer, and styrene-methyl methacrylate-butadiene graft copolymer. Such blends have improved impact strength and clarity.

---

This invention relates to polyblend resins of the vinyl halide type having improved physical characteristics.

Vinyl halide resins such as vinyl chloride, vinylidene chloride and the like have been found suitable when present in the appropriate proportions for the manufacture of rigid articles such as bottles, sheets, film, pipe, gutter spouts, siding and numerous other structural articles. Specific emphasis for these products is being placed in the field of blown bottleware, and structural products such as house siding, rain gutters and the like.

Polyvinyl chloride homopolymer is generally not acceptable for structural applications mainly due to its low impact strength, but is highly touted for its inertness to the action of other chemicals. In rigid structural materials such as those set forth, good physical properties are critical to the success of the structural articles. Vinyl compounds are especially suited for structural usage because of good weathering properties, but as stated above, polyvinyl chloride, per se is physically deficient due to low impact strength. Numerous attempts have been made to improve the physical characteristics of vinyl halide resin compositions to render them suitable for plastic bottles, films, sheets, and other structurally oriented articles. Substantial emphasis has been placed on the development of a vinyl compound having good impact strength, clarity and weatherability. To date, no solution has been conceived for simultaneously acquiring optimum results for each of these properties, but much has been done to optimize the combination. In other words, where one composition excels in impact strength, its weatherability and/or clarity are deficient.

One development in rigid plastics is physical mixtures of vinyl chloride polymers or copolymers of vinyl chloride monomers and other ethylenically unsaturated monomers with chlorinated olefins such as chlorinated polyethylene. Exemplary of such a mixture is the Frey et al. Patent 3,006,889, which teaches physical mixtures of polyvinyl chloride and copolymers thereof with chlorinated polyethylene within certain proportions. Similarly, the Hankey et al. Patent 3,145,187, teaches the addition of a surfactant to polyvinyl chloride-chlorinated polyethylene physical mixtures in the composition ranges where the chlorinated polyethylene is incompatible with polyvinyl chloride.

Paralleling the physical mixtures of polyvinyl chloride and other components, polymerization of the vinyl chloride monomer or vinyl monomer in the presence of chlorinated polyethylene or other polymers or copolymers have been shown to provide graft polymer compositions having superior physical characteristics to those of the corresponding physical mixtures. In any event, both the physical mixtures and the graft polymers do improve the physical characteristics of the composition over that polyvinyl chloride, per se. Accordingly, these compositions have been deemed somewhat suitable for applications similar to those for which the present invention is directed.

Further attempts have been made to improve the physical characteristics of the resinous compositions by providing physical mixtures of polyvinyl chloride and/or copolymers with various graft polymerization end products. Exemplary achievements are the Hayes Patent 2,802,809, the Heaps et al. Patent 3,167,598 and the Fedderson Patent 2,889,308. Still further, Patent 3,053,800 to Grabowski teaches blends of polyvinyl chloride and acrylonitrile, butadiene, styrene graft copolymers and copolymers of acrylonitrile styrene and alpha methyl styrene.

All of the above patents contain teachings of specific resinous compositions characteristic of having improved physical characteristics over those of polyvinyl chloride, per se, and all of which are somewhat useful in application for the production of structural plastic items. These compositions afford improved impact strength, tensile strength and heat stability to the final product made from the composition. Noteworthy, however, is the fact that while blends of polyvinyl chloride homopolymer or vinyl chloride copolymers with graft copolymers such as polyvinyl chloride-chlorinated polyethylene provide compositions of enhanced impact strength, they are somewhat deficient in light transmittance.

It is, therefore, an object of this invention to provide a vinyl halide composition that has enhanced impact strength, and clarity.

Another object of this invention is to provide a superior vinyl halide composition suitable for blown bottleware.

Still another object of this invention is to provide a vinyl halide composition that is suitable for formation of structural products designed for outside use.

These and other objects will become more apparent from the following detailed discussion of the present invention.

The present invention is yet a further step in the development of rigid vinyl halide compositions having mainly improved impact strength, weatherability and clarity. The resinous compositions of the present invention are suitable for extrusion, calendering, injection molding, blow molding, vacuum forming, or compression molding to produce items such as pipe, gutter spouts, siding, plastic bottles, films, sheets, as well as numerous other shaped plastic articles.

The present invention is generally directed to a novel blend of (A) a graft copolymer resin obtained by polymerizing vinyl chloride alone or mixed with a suitable monomer copolymerizable therewith in the presence of an ethylene polymer; (B) a graft copolymer prepared by polymerizing a mixture of styrene and methyl methacrylate in the presence of a copolymer of butadiene and styrene or methyl methacrylate; and (C) a polymer having incorporated therein at least 70 percent vinyl chloride.

Constituent (A) is a graft copolymer prepared by polymerizing vinyl chloride monomer or a mixture of comonomers including at least 50 percent vinyl chloride and a monomer copolymerizable therewith in the presence of 4 to 20 percent of an ethylene polymer of the type described below.

Numerous monomers are suitably copolymerizable with vinyl chloride in the preparation of the constituents (A)

or (C). While the group from which these monomers is obtained is not so specifically limited, vinyl acetate, vinyl laurate, alkyl acrylates, alkyl methacrylates, alkyl maleates, alkyl fumarates, vinylidene chloride, acrylonitrile, vinyl lauryl ether and vinyl myristyl ether are suitable.

The ethylene polymer or backbone polymer, in the preparation of constituent (A) is generally a chlorinated ethylene polymer but is not so limited. Both chlorinated high and low density polyethylene are suitable. Further, the chlorinated polyethylene may have been homogeneously chlorinated in the dry, dispersed or dissolved state, and additionally may have been chlorinated in the presence or absence of solvents or swelling agents. The chlorination reaction may be activated by heat, light, or free radical initiators. The chlorinated polyethylene may also be crosslinked or uncrosslinked and the compounds preferably contain a chlorine content in the range of 20–45% by weight.

A second suitable ethylene polymer is a copolymer of ethylene and propylene that is chlorinated in the same ways as the polyethylene. The chlorinated copolymer of ethylene and propylene also preferably contains 20–45% by weight of chlorine.

A copolymer of ethylene and vinyl acetate is a further trunk polymer onto which the polyvinyl chloride or copolymers thereof may be grafted. The ethylene/vinyl acetate copolymer may be uncrosslinked or slightly crosslinked and preferably contains vinyl acetate in the range of 30–75% by weight.

A copolymer of ethylene and vinyl chloride is another example of a suitable backbone polymer for the preparation of constituent (A). The ethylene/vinyl chloride copolymers may be uncrosslinked or slightly crosslinked and preferably should contain from about 30–75% by weight of vinyl chloride.

Still further, another example of a suitable ethylene trunk polymer is a copolymer of ethylene and ethyl acrylate preferably having an ethyl acrylate content of 20–65% by weight.

The graft copolymer of constituent (B) is prepared by polymerizing 10–200 parts of a mixture of styrene and methyl methacrylate in the presence of 100–130 parts of a rubbery copolymer of butadiene and styrene or butadiene and methyl methacrylate. The styrene-methyl methacrylate monomer mixture has a ratio of styrene to methyl methacrylate of from about 2:1 to about 1:2 whereas the butadiene-styrene or butadiene-methyl methacrylate copolymer is prepared in a ratio of about 90:10 to about 70:30.

Constituent (C) may be vinyl chloride homopolymer or a vinyl chloride copolymer of at least 70 percent vinyl chloride and some other monomer copolymerizable therewith. Suitable comonomers include, but are not limited to, vinyl acetate, vinyl laurate, alkyl acrylates, alkyl methacrylates, alkyl maleates, alkyl fumarates, vinylidene chloride, acrylonitrile, vinyl lauryl ether and vinyl myristyl ether.

While very broad ranges of mixtures of constituents (A), (B) and (C) provide improved polyvinyl chloride compositions, the preferred ranges reside in the area wherein the sum of consituents (A) and (C) ranges from about 89 to about 97% by weight of the total compositions and where the sum of constituents (A) and (B) represent from about 50 to about 100% by weight of the total compositions. Furthermore, individual preferred ranges of the various constituents include (A) in the range of from about 40 to about 97%; (B) from about 3 to about 20% and (C) from about 0 to about 57% by weight of the total compositions.

The polyvinyl chloride graft copolymers of constituent (A) may be prepared as described in co-pending application Ser. No. 204,031, filed June 21, 1962 now U.S. Patent 3,268,623. Such process teaches the polymerization of a vinyl chloride monomer in the presence of varying amounts of chlorinated polyethylene preferably in aqueous suspension wherein the reaction was initiated by a peroxidic initiator. Chlorinated polyethylene is substantially dissolved in the vinyl chloride monomer, laurolyl peroxide is added and the polymerization allowed to proceed at temperatures of 25–80° C., and preferably, 45–65° C., until a pressure drop indicates at least 80% monomer conversion.

For a better understanding of the present invention, the following examples and comparative tables are included. These examples are not to be construed as limiting the present invention, but are only evidence of the results obtained by practice of the present invention and are indicative of operating conditions under which the compositions of the present invention are prepared. Unless otherwise indicated, parts are by weight.

EXAMPLE I 100 parts of a polyvinyl chloride graft copolymer resin was obtained by polymerizing vinyl chloride monomer in the presence of 7% chlorinated polyethylene (24% chlorine, intrinsic viscosity of 0.78). The reaction proceeded at 57° C. using a lauroyl peroxide catalyst having a specific viscosity of 0.43 (0.42% in cyclohexanone). Two parts of a tin stabilizer and 0.5 part of lubricant were then added to the graft resin and the mixture was milled on a two-roll mill at 170° C. After 10 minutes of milling, a ⅛ inch thick sheet was drawn off and test samples were prepared from the milled sheet. A second ⅛ inch thick sample was press-molded at 180° C. for 5 minutes at 2000 p.s.i. A 40 mil thick, press-polished sheet was used for determination of haziness on a GE spectrophotometer by light transmittance at 550 millimicrons wavelength (ASTM D–1003–52).

The aforedescribed samples were analyzed and the data set forth in Table I where it may be compared with analyzed samples from Examples II and III.

EXAMPLE II

A mixture was prepared from 30 parts of the graft copolymer resin described in Example I, 65 parts of a polyvinyl chloride homopolymer resin (specific viscosity—0.42) and 5 parts of a powdery graft copolymer of 80 parts of a mixture of styrene and methyl methacrylate in a ratio of 1:2 graft polymerized in aqueous emulsion upon 100 parts of a butadiene/styrene (75/25) copolymer. This mixture was milled and samples extracted as described in Example I. This composition is a product of the present invention.

EXAMPLE III

A mixture was prepared from 93 parts of a polyvinyl chloride homopolymer resin having a specific viscosity of 0.39 and 7 parts of the powdery graft copolymer of styrene-methyl methacrylate/butadiene-styrene used in Example II above. This mixture was blended and samples extracted therefrom as described in Example I.

TABLE I

| Example | I | II | III |
|---|---|---|---|
| Izod impact, ft./lbs./in. | | | |
| Milled sheet | 1.9 | 3.0 | 0.5 |
| Molded sheet | 10.2 | 16.5 | 2.1 |
| Percent haze by transmittance at 550 mm. (ASTM D–1003–52) | 5.1 | 6.6 | 10.5 |

Referring to Table I, it is noted that the blend of Example II has higher impact strengths than either Examples I or III. Furthermore, haze data is bettter than Example III, but not as good as Example I. Impact strength is, however, equally important and this data is indicative of the fact that some concessions must be made. It is quite evident from this data that the samples extracted from the composition of Example II are superior in the overall sense than those of Examples I or III.

Tensile properties determined on press-molded test specimens of Examples I, II and III have been found to be as follows (test speed .2″/min.):

TABLE II

| Example | I | II | III |
|---|---|---|---|
| Tensile stress, p.s.i. at— | | | |
| Yield | 7,150 | 6,250 | 8,220 |
| Failure | 4,420 | 5,000 | 4,610 |
| Elongation at yield | 3.0 | 3.0 | 2.8 |
| Tensile modulus, p.s.i.×10⁵ | 3.54 | 3.45 | 4.0 |

Data set forth in Table II show that there is no appreciable loss in tensile strength properties which is normally found when achieving high impact strength.

Test samples of each of the blends of Examples I, II and III were injection molded on a two-ounce reciprocating screw injection molding machine from both compound pellets and powder blends at 210° C. stock temperature and 17,000 p.s.i. injection pressure. Notched impact strength of the highly transparent injection molded test samples is reproduced in Table III as follows:

TABLE III

| Example | I | II | III |
|---|---|---|---|
| Izod impact, ft./lbs./in., injection molded from— | | | |
| Dry powder blend | 2.2 | 15.5 | 1.6 |
| Compounded pellets | 1.9 | 14.9 | 0.8 |

Table III by far sets forth evidence of the superiority of the composition of Example II. Yet with the greatly enhanced impact strength, there is also enhanced clarity and no appreciable loss in tensile strength. Example II is an example of a very acceptable molding composition for blow bottleware. All of the attributes are present, i.e. the resistance to other chemicals that is inherently present in vinyl chloride, excellent impact strength, excellent clarity, and good tensile strength.

A further use of the composition of Example II is structural products used out of doors. Rigid siding for example may be easily produced from the composition of Example II. In such case, however, pigment would probably be added to obtain a suitable color for the plastic product. It is, therefore, foreseeable that stabilizers, lubricants and pigments will be added to the compositions of this invention.

EXAMPLE IV

A first graft copolymer resin was prepared by polymerizing 93 parts vinyl chloride in aqueous suspension at 53° C. in the presence of 7 parts of an ethylene/vinyl chloride copolymer with di-isopropylpercarbonate as an initiator. The ethylene/vinyl chloride copolymer containing 54.4 percent vinyl chloride had 31 percent chlorine content and a specific viscosity of 0.13 as measured in a 0.1% tetrahydrofurane solution at 25° C. A second graft copolymer resin was prepared by polymerizing 50 parts of a mixture of styrene and methyl methacrylate (ratio 1:1) in the presence of 100 parts of rubbery copolymer of 85 parts butadiene and 15 parts styrene in aqueous emulsion. The graft copolymers were blended together in a ratio of 97 parts of the first graft copolymer and 3 parts of the second graft copolymer with 2 parts of an organic tin stabilizer and 0.5 part of a lubricant. This composition was then extruded into a hollow parison and blow molded into 4-ounce Boston-round bottles at 385° C. stock temperature and a parison blow up ratio of 4.5.

Likewise, bottles were blown from the compositions of Examples I, II and III. Twenty bottles from each group were filled with water and dropped from various heights onto a concrete floor. Table IV illustrates the estimated mean failure height (EMFH) at 25° C. and at 4° C.

TABLE IV.—ESTIMATED MEAN FAILURE HEIGHT, FEET, 20 SAMPLES

| Examples | 25° C. | 4° C. |
|---|---|---|
| I | 5.8 | 3.4 |
| II | 12.4 | 8.6 |
| III | 6.6 | 4.8 |
| IV | 10.1 | 7.2 |

Table IV is further evidence of the enhanced impact strength of compositions of the present invention. The blends of Examples II and IV are teachings of the present invention and the impact strengths of bottles made therefrom are by far superior to bottles made from blends of Examples I and III. This is evidenced by higher estimated failure height at both 25° C. and 4° C.

It is anticipated that others skilled in the art will find numerous modifications well within the scope of the appended claims. Thus, the above description should not be limiting, but only for guidance and the scope of the present invention should be governed by the appended claims.

What is claimed is:

1. A heat fusible three-component vinyl halide type blend having improved strength and clarity comprising:
   (a) from about 40 to 97 weight percent of a vinyl halide graft copolymer prepared by polymerizing a mixture of:
      (1) compounds selected from the group consisting of vinyl halide monomer and copolymerizable monomer mixtures of at least 50 weight percent vinyl chloride monomer with the balance up to 100 weight percent of such a mixture being other monomers copolymerizable therewith, and
      (2) an ethylene polymer selected from the group consisting of chlorinated polyethylene having a chlorine content of from about 20 to 45 weight percent, chlorinated copolymers of ethylene and propylene having a chlorine content of from about 20 to 45 weight percent, copolymers of ethylene and vinyl acetate containing from about 30 to 75 weight percent vinyl acetate, copolymers of ethylene and vinyl chloride containing from about 30 to 75 weight percent vinyl chloride, and copolymers of ethylene and ethyl acrylate containing from about 20 to 65 weight percent ethyl acrylate,
      (3) said ethylene polymer comprising from about 4 to 20 weight percent of said mixture,
   (b) from about 3–20 weight percent of a styrene-methyl methacrylate-butadiene graft copolymer prepared by polymerizing a total mixture of:
      (1) a monomer mixture of styrene and methyl methacrylate,
      (2) a rubbery copolymer selected from the group consisting of butadiene/styrene and butadiene/methyl methacrylate,
      (3) the ratio of styrene to methyl-methacrylate ranging from about 2:1 to 1:2 in a said monomer mixture,
      (4) the ratio of butadiene to styrene, or the ratio of butadiene to methyl methacrylate, in a said copolymer ranging from about 90:10 to 70:30,
      (5) there being from about 10 to 200 parts of a said monomer mixture for each 100 to 130 parts of a said rubbery copolymer,
   (c) up to about 57 weight percent of a vinyl chloride polymer selected from the group consisting of vinyl chloride homopolymers and copolymers prepared from at least 70 weight percent of vinyl chloride monomer with the balance up to 100 weight percent being other monomers copolymerizable therewith,
   (d) the combined weight of said vinyl halide graft copolymer and said vinyl chloride polymer ranging from about 80 to 97 weight percent of a given blend, and
   (e) the combined weight of a said vinyl halide graft copolymer and said styrene-methyl methacrylate-butadiene graft copolymer being at least about 43 weight percent.

2. A blow molded container formed from the blend of claim 1.

3. A blow molded article having a composition as defined in claim 1.

4. An extruded article having a composition as defined in claim 1.

5. An injection molded article having a composition as defined in claim 1.

References Cited

UNITED STATES PATENTS

| | | | |
|---|---|---|---|
| 3,085,082 | 4/1963 | Baer et al. | 260—876 XR |
| 3,112,290 | 11/1963 | Salyer | 260—878 |
| 3,268,623 | 8/1966 | Beer | 260—876 |
| 3,322,857 | 5/1967 | Coaker et al. | 260—876 |

FOREIGN PATENTS

| | | |
|---|---|---|
| 626,534 | 8/1961 | Canada. |
| 1,372,908 | 8/1964 | France. |
| 1,381,031 | 10/1964 | France. |

GEORGE F. LESMES, *Primary Examiner.*

U.S. Cl. X.R.

264—98, 331